Patented June 16, 1953

2,642,385

UNITED STATES PATENT OFFICE 2,642,385

CATALYTIC REFORMING OF HYDROCARBONS

Charles V. Berger, Western Springs, and Vladimir Haensel, Hinsdale, Ill., assignors to Universal Oil Products Company, Chicago, Ill., a corporation of Delaware No Drawing. Application January 27, 1950, Serial No. 140,944

7 Claims. (Cl. 196—50)

1

This application is a continuation-in-part of our co-pending application Serial No. 94,498, filed May 20, 1949.

This invention relates to the catalytic conversion of hydrocarbon fractions containing naphthenes and paraffins. It is more specifically concerned with a particular method of reforming straight run gasolines and naphthas in the presence of hydrogen and reforming catalysts comprising platinum or palladium composited with a cracking component.

Catalysts comprising platinum or palladium composited with a cracking component are especially useful in the reforming of hydrocarbons. Hydrocracking and isomerization of paraffins and dehydrogenation of naphthenes are among the principal reactions that are promoted by these catalysts, which are capable of increasing the octane number of straight run gasolines and naphthas to values that are substantially higher than those that ordinarily can be reached by thermal reforming. In addition, the yield-octane number relationships realized with these catalysts are much better than are the corresponding relationships obtained in thermal reforming and in most of the prior catalytic reforming processes. However, these catalysts possess the disadvantage that the activity thereof decreases relatively rapidly with use due chiefly to the deposition of carbonaceous material thereon.

As the activity of the catalysts declines it is necessary to compensate therefor if a product of constant quality is desired. In any given plant, the most direct and inexpensive method of compensating usually comprises increasing the reaction temperature. However, when this is done, it has been found that hydrocracking is promoted to a greater extent than is the dehydrogenation reaction. Consequently the balance between these reactions is destroyed and greater losses to light gases as well as greater consumption of hydrogen is encountered because of the relatively greater proportion of hydrocracking. In addition, the rate of fouling of the catalysts is increased at the higher temperatures.

We have invented a method of controlling the relative amounts of hydrocracking and dehydrogenation, and, in particular, we have invented a method of suppressing the tendency toward increased hydrocracking as the reaction temperature is increased.

In one embodiment our invention relates to an improvement in the reforming of a hydrocarbon fraction containing paraffins and naphthenes by subjecting the same to the action of the catalyst

2 comprising a cracking component and a metal selected from the group consisting of platinum and palladium in the presence of hydrogen at reforming conditions, said improvement comprising controlling the degree of hydrocracking by regulating the partial pressure of water in the reforming zone.

In a more specific embodiment our invention relates to a reforming process which comprises continuously contacting hydrogen and a normally liquid hydrocarbon fraction containing paraffins and naphthenes and boiling below about 425° F. with a catalyst consisting essentially of a cracking component and a metal selected from the group consisting of platinum and palladium, said cracking component comprising silica and at least one other metal oxide, at a temperature of from about 600° to about 1000° F. and a pressure greater than about 250 p. s. i. a., increasing the reaction temperature at intervals to compensate for loss in catalyst activity and concurrently increasing the water content of the reaction mixture to maintain the amount of hydrocracking substantially constant.

Reforming catalysts comprising platinum or palladium and a cracking component become deactivated relatively rapidly by deposition of carbonaceous material thereon, with the result that they must be regenerated frequently if they are to be used for economic periods of time. We have discovered that the tendency toward fouling is due to the high cracking or hydrocracking activity of the catalysts. We have further found that by maintaining a finite partial pressure of water in the reforming zone, the hydrocracking activity can be reduced with a concomitant reduction in the catalyst fouling rate. By appropriate control of the water vapor content of the reaction mixture, the fouling rate can be reduced to a point at which catalysts can be used for months without regeneration. As a consequence, reforming plants employing such catalysts can be built without regeneration facilities, thereby effecting great savings in initial investment. In addition, marked savings in operating costs are made possible by the omission of the regeneration step. In summary, a principal advantage of our process is that it makes possible the reforming of straight run gasolines and the like with catalysts comprising palladium or platinum and a cracking component in a nonregenerative type of process.

As hereinbefore mentioned, an especially useful embodiment of our invention comprises the use of water to suppress the tendency toward increased hydrocracking as the reaction temperature is raised during the course of the reforming run employing a catalyst comprising platinum or palladium and a cracking component. However, it has been observed that the hydrocracking activity occasionally increases, at least for a period of time, even though the reaction temperature is maintained at a constant value. The exact reason for the gain in activity is not known, but there are indications that the gain is due to dehydration of the catalysts and/or to an increase in the impurity content of the same brought about by absorption of or reaction with impurities present in the charging stock that promote hydrocracking. Both of these changes in activity effect the selectivity of the catalyst in a manner such that the hydrocracking reaction is increased relative to naphthene dehydrogenation reactions. In such a case, water or a water-forming compound may be added to the reaction zone to again bring the hydrocracking and dehydrogenation reactions back into balance.

In a broad apsect, our invention relates to the use of water, or compounds which liberate water under the conditions of reaction, in the reforming of hydrocarbons to control the balance between the various reactions promoted by the platinum- or palladium-cracking component catalyst. The amount of hydrocracking can be substantially independently regulated by water addition with little effect on the other reactions promoted by the catalysts. Thus, the use of water or equivalent compounds permits greater flexibility in catalyst composition with resulting benefits in catalyst life and product quality.

Another useful application for our invention is in the production of aromatics by the dehydrogenation of charge stocks consisting essentially of naphthenes using a catalyst of the type herein described. The water suppresses hydrocracking of the naphthenes and thus makes possible major yields of aromatics.

The use of water as a hydrocracking suppressor is particularly advantageous in that the effect of water usually is only temporary. Therefore, the amount of hydrocracking obtained in reforming processes employing the catalysts herein described not only can be decreased by adding more water or water-forming compounds to the reaction mixture, but the degree of hydrocracking can be increased by diminishing the amount of water or water-forming compounds added to the reaction mixture. There appears to be no permanent impairment or deactivation of the catalyst from the amounts of water normally used in practicing our invention.

The hydrocarbon stocks that will be converted in accordance with our process comprise hydrocarbon fractions containing naphthenes and paraffins. The preferred stocks are those consisting essentially of naphthenes and paraffins, although in some cases aromatics and/or olefins also may be present. This preferred class includes straight run gasolines, natural gasolines, and the like. On the other hand, it frequently is advantageous to charge thermally cracked gasolines or higher boiling fractions thereof to our reforming process. The gasoline may be full boiling range gasoline having an initial boiling point of from about 50° to about 100° F. and an end boiling point within the range of from about 325° to about 425° F. or it may be a selected fraction thereof which usually will be a high boiling fraction, commonly referred to as naphtha, and generally having an initial boiling point within the range of from about 125° to about 250° F. and an end boiling point within the range of from about 350° F. to about 425° F.

The catalysts comprising platinum, palladium, or other members of group VIII of the periodic table having an atomic weight greater than 100, and a cracking component that are preferred for use in our hydrocarbon reforming process may contain substantial amounts of platinum, palladium, etc., but, for economic as well as for product yield and quality reasons, the platinum or palladium content usually will be within the range of from about 0.05% to about 1.5%.

The cracking component to be composited with the group VIII metal may comprise any suitable cracking catalyst, either naturally occuring or synthetically produced. Naturally occuring cracking catalysts include various aluminum silicates, particularly when acid treated to increase activity, such as Super-Filtrol, etc. Synthetically produced cracking catalysts include silica-alumina, silica-zirconia, silica-alumina-zirconia, silica-magnesia, silica-alumina-magnesia, silica-alumina-thoria, alumina-boria, etc. These catalysts may be made in any suitable manner including separate, successive, or coprecipitation methods of manufacture. Preferred cracking catalysts comprise silica-alumina or silica-alumina-zirconia which preferably are manufactured by commingling an acid, such as hydrochloric acid, sulfuric acid, etc., with commercial water glass under conditions to precipitate silica, washing with acidulated water or otherwise to remove sodium ions, commingling with an aluminum salt such as aluminum chloride, aluminum sulfate, aluminum nitrate, and/or a zirconium salt, etc., and either adding a basic precipitant, such as ammonium hydroxide, to precipitate alumina and/or zirconia, or forming the desired oxide or oxides by thermal decomposition of the salt as the case may permit. The silica-alumina-zirconia catalyst may be formed by adding the alumina and/or zirconia salts together or separately. The catalyst may be in the form of granules of irregular size and shape or the ground granules may be formed into pellets of uniform size and shape by pilling, extrusion, or other suitable methods.

A particularly satisfactory method of forming a cracking component is to add the acid to commercial water glass at a pH controlled to form silicahydrogel, discharging the mixture of acid and water glass from a rotating disc or nozzle into a bath of oil of sufficient depth so that the silicahydrogel sets into firm spheres during passage through the oil bath. The spheres may be removed from the bath in a suitable manner, such as by being transported in a stream of water disposed beneath the oil layer. The silica spheres may then be treated in any suitable manner to remove sodium ions, followed by impregnation with a solution of soluble metal salt or salts. In another embodiment silica-alumina spheres, silica-magnesia spheres, etc. may be formed by coprecipitation methods in a similar system.

It is preferred that the cracking component be dried at a temperature of at least about 350° F. before the platinum or palladium is composited therewith. The cracking component may be dried at a temperature of from about 350° to about 500° F., and/or calcined at a temperature of from about 500° to about 1400° F. or more prior to admixing the platinum or palladium therewith.

The platinum or palladium preferably is added to the dry cracking component in the presence of ammonium hydroxide. A particularly preferred method of incorporating platinum with dry cracking components is to commingle chloroplatinic acid with ammonium hydroxide to form a mixture having a pH within the range of from about 5 to about 10 and preferably from about 8 to about 10 and then commingling this mixture with the preformed particles. It is to be understood that the ammonium hydroxide-platinum compound may be added first to the preformed particles and that thereafter the other components may be added, and also that these components may be composited either as cold or as hot solutions.

Another method of impregnating the cracking component with platinum is to form a separate solution of chloroplatinic acid and hydrogen sulfide followed by impregnation of the cracking component with the resulting mixture.

After the platinum or palladium has been composited with the cracking component, the resulting material is washed, dried, and calcined. Drying ordinarily will be effected at a temperature of from about 220° to 500° F. and calcination ordinarily will be carried out at a temperature of from about 500° to about 1000° F.

In the operation of our process, water or steam may be added in the required amounts to the charging stocks or may be added directly to the reaction zone. If desired, materials that form water under the conditions prevailing in the reforming zone may be used in place of water. Materials of this type include oxygen and certain alcohols such as tertiary butyl alcohol, peroxide, hydroperoxide, phenols, and carbon oxides, particularly carbon dioxide. In general, we prefer to use water because of its low cost and because the use thereof does not introduce contaminating organic radicals into the reaction mixture. In order to achieve accurate control, it frequently is desirable to prefractionate the hydrocarbon charging stock to remove dissolved water, oxygen, and oxygenated compounds therefrom and thereafter to add to the fractionated charge stock the desired amount of water or equivalent compound. If this procedure is followed, the partial pressure of water in the reaction zone can be closely regulated, since it is not influenced by variable amounts of water and the like in the charging stock. Instead of drying the charging stock by fractionation, it might be desirable in some cases to accomplish the same results by passing the charging stock at an elevated temperature through a bed of activated alumina or similar desiccant.

Hydrocarbons may be reformed in accordance with our process using fluidized, fluidized-fixed bed, suspensoid, and moving bed types of processes. However, we prefer to use fixed bed processes, primarily because processes of this type tend to minimize attrition losses of the relatively expensive catalysts. One fixed bed method of utilizing our invention comprises preheating hydrogen and hydrocarbon charge stocks to a conversion temperature, and passing the same in admixture with the requisite amount of water vapor through a plurality of substantially adiabatic reaction zones containing a catalyst comprising platinum or palladium and a cracking component. In all but the last stages, the reaction is endothermic, hence the reactant streams passing between the reaction zones are reheated to the desired temperature. The reformed hydrocarbons are recovered, and the hydrogen is separated and recycled to the reaction zone. Another type of fixed bed process that is particularly suitable for certain types of operations comprises passing the hydrocarbon charging stock together with hydrogen and the requisite amount of water through tubes containing catalyst, said tubes being subjected to radiant heat from a radiant flame and the resulting hot products of combustion. Here again the reformate is recovered and the hydrogen is separated and recycled to the reaction zone.

Hydrocarbon reforming operations carried out in accordance with our invention ordinarily will be conducted at temperatures of from about 600° F. to about 1000° F. At temperatures in the vicinity of 600° F. and lower, the aromatic-naphthene equilibrium is unfavorable, the reaction rates are quite low, and very low space velocities must be employed to obtain appreciable conversion. At temperatures in excess of 1000° F. a significant amount of thermal reaction takes place accompanied by poorer liquid recovery and more rapid catalyst deactivation.

The pressures at which our process will be conducted will lie within the range of from about 50 to 1200 pounds per square inch; a total pressure of at least 250 pounds ordinarily is preferred. The weight hourly space velocity, which is defined as the weight of hydrocarbons charged per hour per weight of catalyst in the reaction zone, should lie within the range of from about 0.2 to about 40. The amount of hydrogen charged along with the hydrocarbons usually will be from about 0.5 to about 15 mols per mol of hydrocarbon.

The amount of water required to obtain the desired degree of hydrocracking suppression can be determined by simple experimentation. For example, it is possible to ascertain whether the amount of water being added to the charging stock in a multiple adiabatic reactor system is correct by observing the total temperature drop through the reactors. For example, if a fresh catalyst is giving a satisfactory product distribution at a given total $\Delta T$, then the amount of water added as the run progresses and the reaction temperature is increased should be such as to hold the total $\Delta T$ essentially constant. If this procedure is followed the ratio between hydrocracking and aromatization will be held substantially constant and, consequently, the product distribution will remain approximately the same as that experienced early in the run. However, if a substantial change in heat capacity of the material in the reaction zone has taken place by means such as a variation in the ratio or the composition of the recycle gas, this fact should be taken into account. In such a case, a more accurate procedure would be to keep the product of heat capacity and $\Delta T$ substantially constant in order that the ratio between hydrocracking and aromatization be maintained substantially constant.

A relatively simple method of determining the correct amount of water is to observe the composition of the reformate, particularly the degree of hydrocracking being obtained, and to adjust the water content of the reaction mixture to give the desired degree of hydrocracking.

From the foregoing, it can be seen that we have invented an improvement in the reforming of hydrocarbons in the presence of catalysts comprising platinum or palladium composited with a cracking component, said process resulting in better yield and longer catalyst life, including weeks and even months of operation without regeneration. Our invention permits a greater degree of flexibility both in the composition of the catalysts employed and in the relative amounts of the hydrocarbon reactions that are obtained.

We claim as our invention:

1. In a reforming process wherein a normally liquid hydrocarbon fraction containing paraffins and naphthenes boiling below about 425° F. is passed with hydrogen and at reforming conditions through a catalyst comprising a metal selected from the group consisting of platinum and palladium and a composite of silica with at least one metal oxide selected from the group consisting of alumina, zirconia, magnesia and thoria to effect hydrocracking of paraffins and dehydrogenation of naphthenes, and wherein the extent of said hydrocracking tends to increase in the later stages of the processing period, the method of maintaining the extent of hydrocracking substantially constant over said processing period which comprises introducing $H_2O$ to the reforming zone during the later stages, at least, of the processing period and regulating its partial pressure to suppress said increased tendency toward hydrocracking.

2. In a reforming process wherein a normally liquid hydrocarbon fraction containing paraffins and naphthenes boiling below about 425° F. is passed with hydrogen and at reforming conditions through a catalyst comprising a metal selected from the group consisting of platinum and palladium and a composite of silica with at least one metal oxide selected from the group consisting of alumina, zirconia, magnesia and thoria to effect hydrocracking of paraffins and dehydrogenation of naphthenes, and wherein the extent of said hydrocracking tends to increase with increasing temperature and decreasing catalyst activity, the method of maintaining the extent of hydrocracking substantially constant over an extended time interval, including the period of reduced catalyst activity, which comprises introducing $H_2O$ to the reforming zone during said period of reduced catalyst activity and regulating its partial pressure to suppress said increased tendency toward hydrocracking.

3. In a reforming process wherein a normally liquid hydrocarbon fraction containing paraffins and naphthenes boiling below about 425° F. is passed with hydrogen and at reforming conditions through a catalyst comprising a metal selected from the group consisting of platinum and palladium and a composite of silica with at least one metal oxide selected from the group consisting of alumina, zirconia, magnesia and thoria to effect hydrocracking of paraffins and dehydrogeneration of naphthenes, and wherein the activity of the catalyst declines with continued passage of the hydrocarbons therethrough, the method which comprises increasing the reforming temperature at intervals to compensate for reduced catalyst activity, whereby the extent of said hydrocracking tends to increase, and increasing the water content of the reaction mixture with increasing temperature to suppress said increased tendency toward hydrocracking.

4. The process of claim 1 further characterized in that the initial stages of said processing period are performed in the absence of added water and in that water is added to said hydrocarbon fraction during said later stages.

5. The process of claim 2 further characterized in that the reforming is effected in the absence of added water prior to said period of reduced catalyst activity.

6. The process of claim 1 further characterized in that said $H_2O$ is introduced to the reforming zone in the form of water in admixture with the hydrocarbon fraction to be reformed.

7. The process of claim 1 further characterized in that said $H_2O$ is formed in situ in the reforming zone from a compound which liberates water under the reforming conditions.

CHARLES V. BERGER.
VLADIMIR HAENSEL.

References Cited in the file of this patent

UNITED STATES PATENTS

| Number | Name | Date |
|---|---|---|
| 2,045,794 | Pier | June 30, 1936 |
| 2,398,674 | Schulze | Apr. 16, 1946 |
| 2,433,603 | Danner et al. | Dec. 30, 1947 |
| 2,478,916 | Haensel et al. | Aug. 16, 1949 |